US012716536B2

(12) United States Patent
Carmichael

(10) Patent No.: US 12,716,536 B2
(45) Date of Patent: Aug. 25, 2026

(54) TRANSFER DEVICE

(71) Applicant: ChargePoint Technology Limited, Liverpool (GB)

(72) Inventor: Mathew Carmichael, Liverpool (GB)

(73) Assignee: ChargePoint Technology Limited, Liverpool (GB)

( * ) Notice: Subject to any disclaimer, the term of this patent is extended or adjusted under 35 U.S.C. 154(b) by 242 days.

(21) Appl. No.: 18/278,713

(22) PCT Filed: Feb. 25, 2022

(86) PCT No.: PCT/GB2022/050511
§ 371 (c)(1),
(2) Date: Aug. 24, 2023

(87) PCT Pub. No.: WO2022/180402
PCT Pub. Date: Sep. 1, 2022

(65) Prior Publication Data

US 2024/0142033 A1 May 2, 2024

(30) Foreign Application Priority Data

Feb. 26, 2021 (GB) ..................................... 2102762

(51) Int. Cl.
*F16L 37/252* (2006.01)
*F16L 11/12* (2006.01)
(Continued)

(52) U.S. Cl.
CPC ........... *F16L 37/252* (2013.01); *F16L 11/122* (2013.01); *F16L 37/34* (2013.01); *B08B 9/032* (2013.01);
(Continued)

(58) Field of Classification Search
CPC ......... F16L 37/252; F16L 1/122; F16L 37/34; F16L 45/00; F16L 2201/44; B08B 9/032; F16K 27/02
(Continued)

(56) References Cited

U.S. PATENT DOCUMENTS 4,754,780 A * 7/1988 Smith, III ............... F16L 37/35 137/614.04
5,263,521 A * 11/1993 Brossard ............. B65G 69/183 141/346
(Continued)

FOREIGN PATENT DOCUMENTS

EP 0754636 A1 1/1997
EP 1550833 A2 7/2005
(Continued)

OTHER PUBLICATIONS

International Search Report and Written Opinion filed in PCT/GB2022/05011 dated May 25, 2022; 18 pgs.

*Primary Examiner* — Sameh Tawfik
(74) *Attorney, Agent, or Firm* — Vedder Price P.C.

(57) ABSTRACT

A transfer device having an active member comprising a main body having an inlet and an outlet that can communicate with one another such that material may pass therethrough by means of a moveable/extendable conduit moveable between a stowed configuration in which the inlet and outlet are not directly linked and an extended configuration in which the conduit extends between the outlet and inlet and in which the outlet and inlet are in communication with one another via the conduit and material may pass therebetween via the conduit.

22 Claims, 11 Drawing Sheets

(51) Int. Cl.
*F16L 37/34* (2006.01)
*B08B 9/032* (2006.01)
*F16K 27/02* (2006.01)
*F16L 45/00* (2006.01)

(52) U.S. Cl.
CPC ............... *F16K 27/02* (2013.01); *F16L 45/00* (2013.01); *F16L 2201/44* (2013.01)

(58) Field of Classification Search
USPC .......................................................... 414/217
See application file for complete search history.

(56) References Cited

U.S. PATENT DOCUMENTS

| | | | | |
|---|---|---|---|---|
| 6,305,443 | B1 | 10/2001 | Semenenko | |
| D757,933 | S * | 5/2016 | Lev | D24/129 |
| 10,299,990 | B2 * | 5/2019 | Lev | A61J 1/2089 |
| 10,753,483 | B2 * | 8/2020 | Feiler | F16K 3/08 |
| 10,961,002 | B2 * | 3/2021 | Mueggenborg | B65D 88/26 |
| 11,224,555 | B2 * | 1/2022 | Chudek | A61J 1/2096 |
| 11,571,362 | B2 * | 2/2023 | Naftalovitz | A61J 1/201 |
| 11,674,614 | B2 * | 6/2023 | Fangrow | A61J 1/2062<br>251/89.5 |
| 12,448,936 | B2 * | 10/2025 | Schimmels | F02K 3/115 |
| 2012/0323210 | A1 * | 12/2012 | Lev | A61J 1/2096<br>604/405 |
| 2016/0144105 | A1 * | 5/2016 | Hooven | A61M 5/1782<br>604/132 |
| 2018/0243810 | A1 * | 8/2018 | Costa | G05B 19/401 |
| 2021/0308012 | A1 * | 10/2021 | Tagliamento | A61J 3/002 |
| 2023/0219132 | A1 * | 7/2023 | Cooper | B22D 41/00<br>222/594 |

FOREIGN PATENT DOCUMENTS

| | | | |
|---|---|---|---|
| EP | 3524365 | A2 | 8/2019 |
| GB | 2295384 | A | 5/1996 |

* cited by examiner

SECTION L-L

TRANSFER DEVICE

FIELD OF THE DISCLOSURE

The present invention relates to a transfer device and method for transferring material. More particularly, the invention relates to apparatus and method for assisting in material transfer during manufacturing processes which may be undertaken in a traditional clean room or in an isolation and/or containment system employed for operator and/or product protection.

BACKGROUND OF THE DISCLOSURE

The transfer of material from one aseptic vessel to another poses a number of problems particularly concerning maintenance of the aseptic environment to prevent the contamination of the material being transferred, the vessels themselves and the surrounding environment in which operators of such transfer devices may be located to effect the transfer of material.

The maintenance of sterility is of fundamental concern in many manufacturing processes, to safeguard against contamination of products being manufactured in the process. Exemplary industries using aseptic production in a traditional manner or in isolation and/or containment facilities include pharmaceutical, medical device, biotechnological and food industries.

Particular difficulty can arise where material for use in manufacture is required to be transferred from one sterile enclosure to another.

Developments in containment facilities led to the introduction of direct and indirect transfer devices. An example of a direct transfer device is a split butterfly valve system and an example of an indirect transfer device includes mating ports, otherwise known as rapid transfer (RTP) ports. Both transfer devices enable material to be transferred from one area to the other without contaminating the material or the surrounding environment.

However, these known ports are not without disadvantage. Commonly, the required location in the process enclosure is provided with a port which engages sealingly with a corresponding port of a transfer container. The mated ports can then be opened to enable material to be transferred from one area to another.

Such known transfer ports give rise to problems particularly when used in aseptic transfers. The presence of the seal or seals is an area of potential contamination which can be present on the exposed perimeter of the seals. Material to be transferred can easily come into contact with exposed sections of the seals compromising the sterility and containment of the material and/or the process enclosure.

Furthermore, known transfer ports are often large or cumbersome for operators to manipulate, often requiring complex lifting equipment which is difficult to manoeuvre and operate in processing environments.

The applicant has appreciated that further improvements can be made to transfer devices to ameliorate one or more problems associated with the prior art.

SUMMARY OF THE DISCLOSURE

In accordance with a first aspect of the present invention, there is provided a transfer device comprising an active and a passive member capable of mating and creating a seal therebetween such that two members may be releasably secured and sealed to one another, each member having a housing having a port and a door for selectively opening or closing the port to control the movement of material therethrough, and maintain a sterile environment, wherein the door has a first configuration in which the door is secured to the port and a seal is formed therebetween and the door is closed, and a second configuration wherein the seal is released and the door is open, wherein the housing of the active member further comprises an outlet that is capable of communicating with port of the active member by means of a conduit moveable relative to the active member housing, said conduit moveable within the housing between a stowed configuration in which the port and outlet are not in communication with one another and an extended configuration in which the port and outlet are in communication with one another via the conduit such that material may pass therethrough.

The present invention avoids issues associated with the prior art including size and weight of valve elements and issues associated with pressure changes and airflow in the active and/or passive element which may cause displacement of any stray material, such as powders, covering elements of the device, such as the doors, which might jeopardise containment and sterility. Furthermore, the present invention avoids the need for heavy and/or cumbersome lifting equipment to move the active and/or passive members to facilitate communication between the passive port and the outlet of the active member.

The present invention may be for use in controlling the flow of a materials that are sterile, or require handling or processing in a sterile or aseptic environment. Materials may include powders, tablets, capsules or items used in conjunction with the storage or delivery of such products, stoppers, vials, flexible bags and/or bottles.

The present invention may be suitable for use at sterilising temperatures. Sterilising temperature may be at least 90° C. at 1 bar pressure. Advantageously, sterilising temperature may be from about 90° C. to 200° C. at 1 bar. An example of conditions satisfying sterilising temperature in accordance with the present invention includes fluid at a temperature of 120° C. at 1 bar, for example.

Media suitable for sterilising include any one or more of the following: steam, Hydrogen Peroxide, Chlorine Dioxide and/or bio-decontaminating media. Advantageously the media is a fluid. More advantageously, the fluid is a gas.

The features of the present invention facilitate its use in microbiological processes owing to the excellent sealing properties conferred by the features of the passive member.

In accordance with a further aspect of the present invention, there is provided a transfer device comprising an active and a passive member capable of mating such that two members to be releasably secured to one another, each member having a port and a door for selectively opening or closing the port to control the movement of material therethrough, wherein one of the doors has a male mating member comprising a protrusion and the other door has a complimentarily shaped female mating member, wherein the protrusion has a moveable element that is displaceable to change the profile of the protrusion to facilitate releasable mating and unlocking of the two doors to facilitate opening thereof.

The applicants have overcome the difficulty associated with first removing the active door and then unlock and remove the passive door. To reduce the complexity of the mechanisms the applicants combined the unlocking of the doors with the joining of the doors.

BRIEF DESCRIPTION OF THE DRAWINGS

The present invention will now be described by way of example only with reference to the accompanying figures, in which.

DETAILED DESCRIPTION OF THE DISCLOSURE

Figure 1:
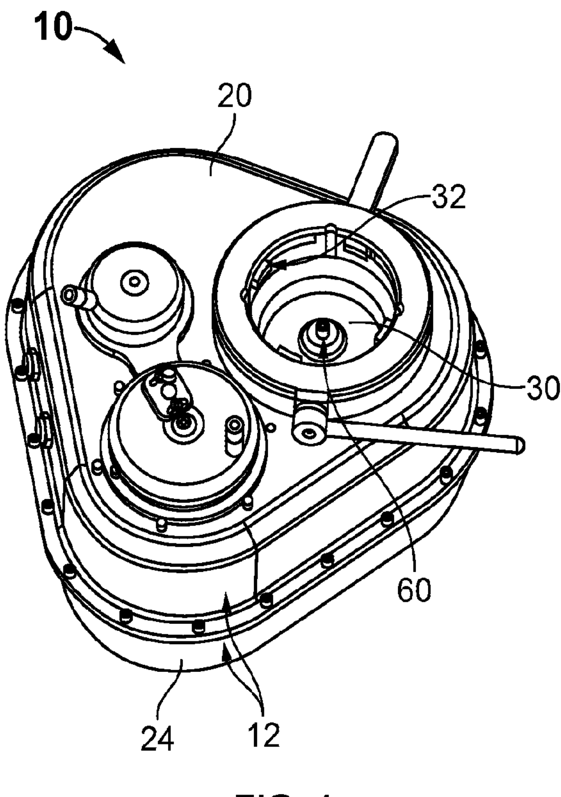
FIG. 1 shows an active member of a transfer device in accordance with the present invention.
Figure 2A:
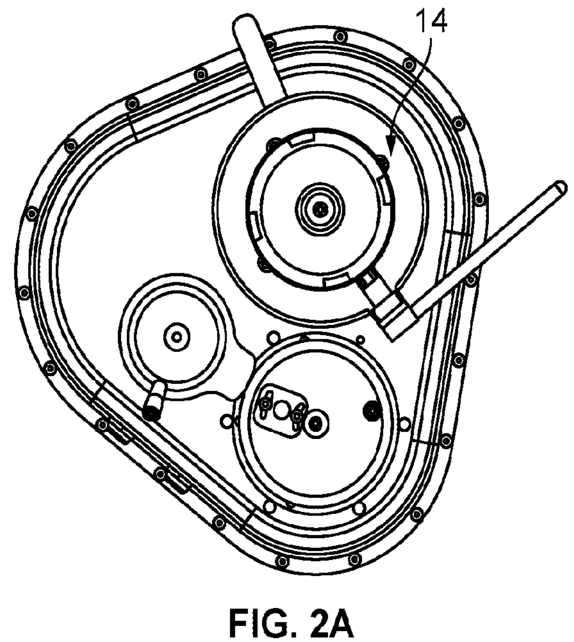
FIG. 2 *a* and *b* are alternative view of the active member shown in FIG. 1.
Figure 2B:
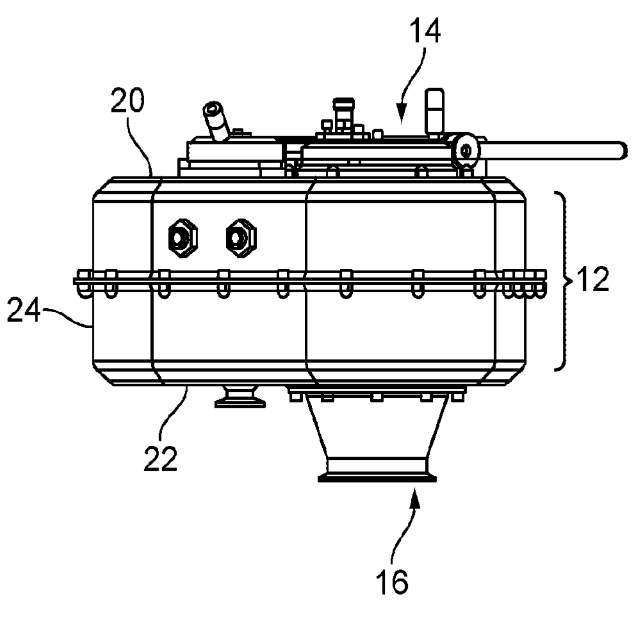
Figure 3:
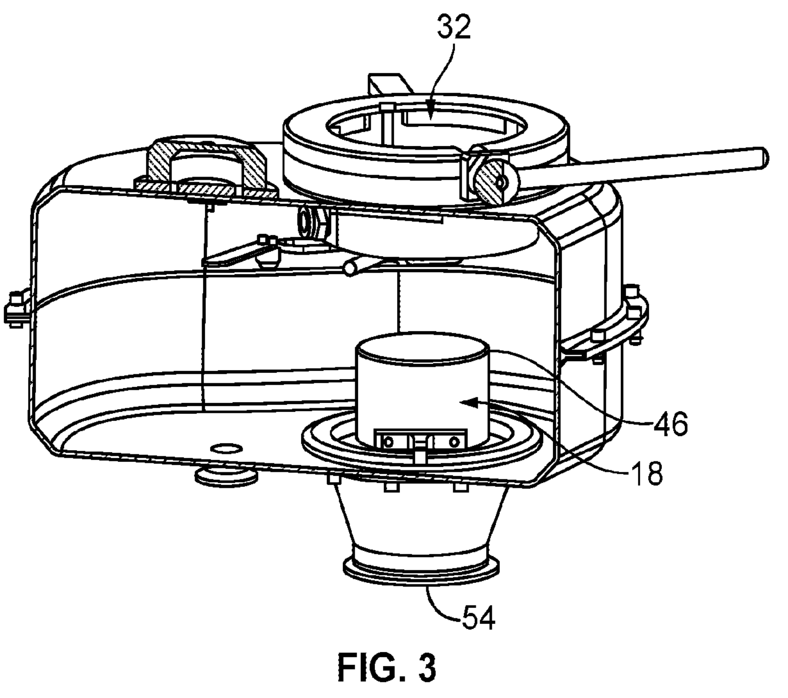
FIGS. 3 and 4 are cross-sectional views of the active member of FIG. 1 and FIG. 2*a* and *b;*
Figure 4:
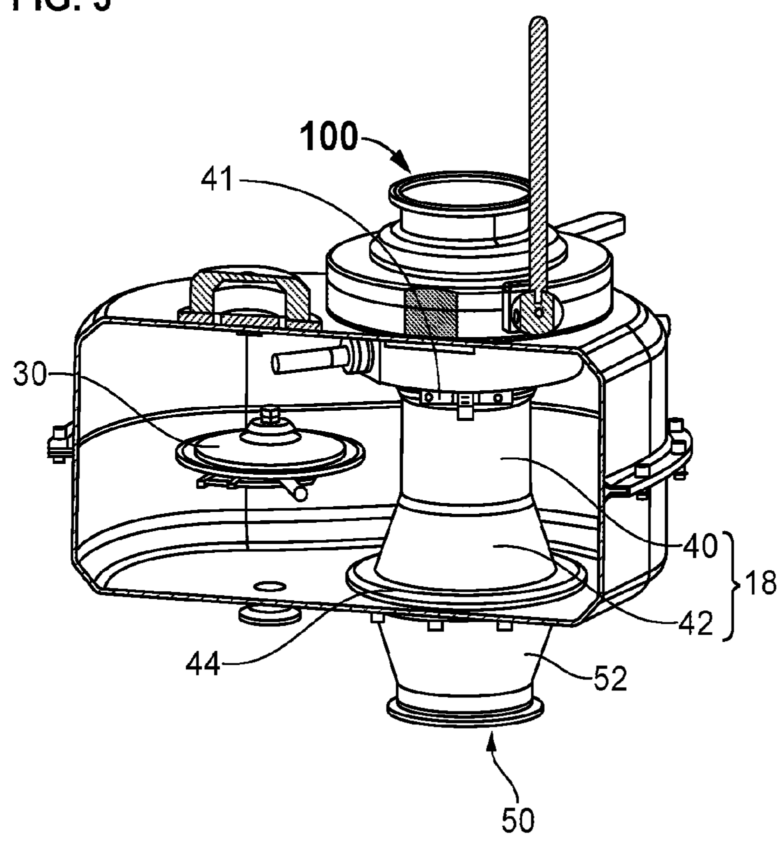
Figure 5:
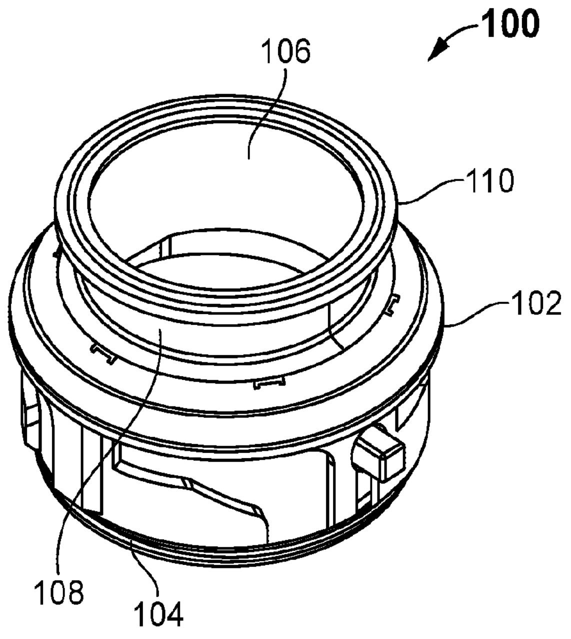
FIG. 5 shows a passive member of a transfer device in accordance with the present invention.
Figure 6A:
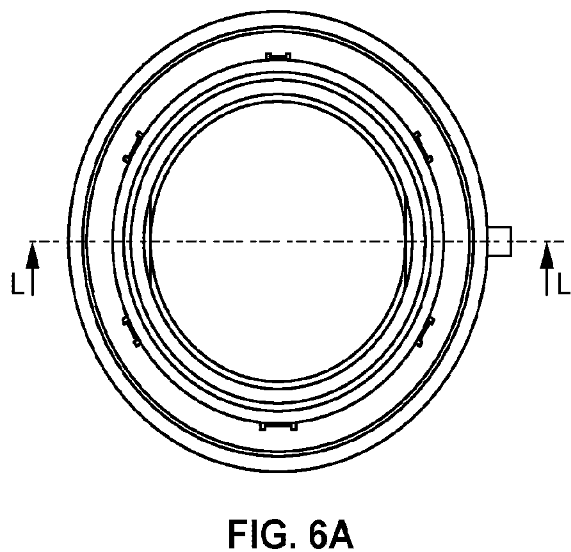
FIGS. 6*a* and *b* show a cross sectional view of FIG. 5.
Figure 6B:
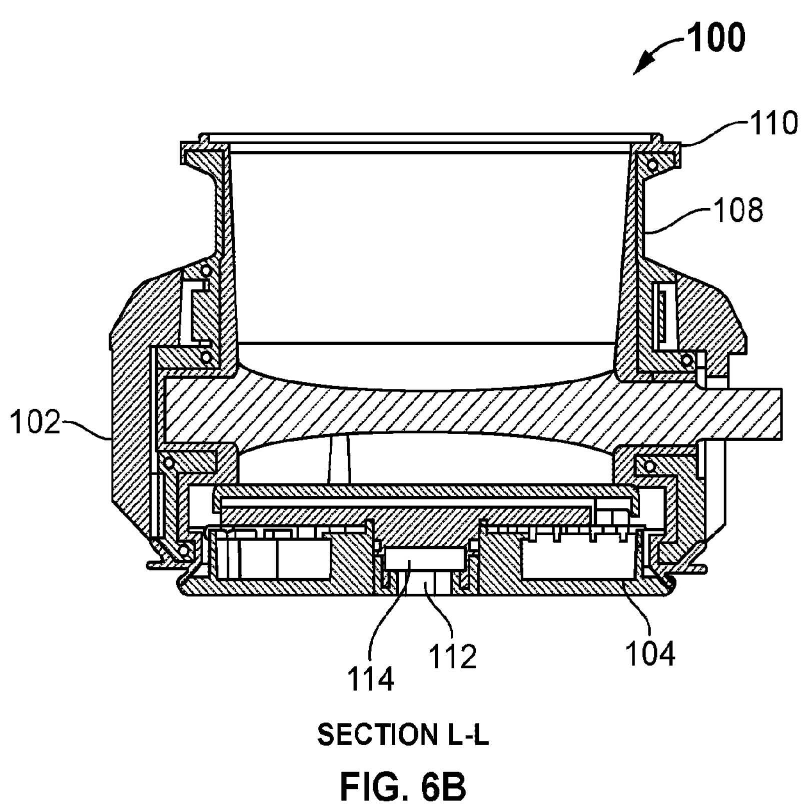

FIGS. 1 to 8 show an active member 10 of the transfer system comprising a main body 12 having an inlet 14 and an outlet 16 that can communicate with one another such that an material may pass therethrough by means of a moveable/extendable conduit 18 moveable between a stowed configuration (FIG. 3) in which the inlet 14 and outlet 16 are not directly linked and an extended configuration (FIG. 4) in which the conduit extends between the outlet 16 and inlet 14 and in which the outlet 16 and inlet 14 are in communication with one another via the conduit 18 and material may pass therebetween via the conduit 18.

The main body 12 has a substantially triangular transverse section having a planar upper 20 and lower 22 surface and a sidewall 24 extending therebetween defining a main body chamber therebetween.

In one corner of the triangular main body 12 is located the inlet 14 in the upper surface 20 being a circular aperture having associated therewith an active locking ring 32, sterilising ring both extending perpendicularly to the upper plane of the body and being cylindrical members.

Associated with the inlet 14 is a door 30 (FIG. 4) capable of being moved from a closed configuration in which the door 30 covers the inlet 14 and the opening is closed and an open configuration in which the door 30 is open and the inlet 14 free to permit the flow of material therethrough. It will be appreciated that the main body 12 may be any suitable shape to provide sufficient internal space within the housing to accommodate the doors of the active and passive member when they are connected to one another and moved out of the flowpath.

In addition, associated with the inlet 14 is the active locking ring 32 which is sized and shaped to cooperate with a complementarily shaped passive member 100 so that the active 10 and passive 100 may be selectively secured together.

The conduit 18 comprises a cylindrical body 40 to which is connected an extendible sidewall member 42 which permits the conduit 18 to be capable of extending between a stowed and deployed configuration. One end 44 of the flexible sidewall member 42 is proximal to the outlet 16 of the main body/housing 12 and secured thereto whilst its free end 46 is associated with the cylindrical body 40 which can selectively extend through the inlet 14 and a portion of the interior of the passive element/member 100. The cylindrical body has a circumferential collar 41 that is connected to an actuating arm 43 to move the conduit between its stowed and extended configurations.

The outlet 16 comprises a circular aperture 50 having a cylindrical sidewall 52 extending in a plane perpendicular to the transverse plane of the main body/housing and having a circumferential outlet flange 54. The flange 54 and sidewall 52 permit downstream processing equipment to be easily attached thereto for material to flow through or into.

(FIGS. 5 and 6) The passive member/element 100 has a cylindrical main housing 102 and an opening selectively closable by a door 104. The main housing 102 has a cylindrical liner 106 which provides a sealing boundary to other elements of the transfer system, a smooth passageway for the transfer of material and one contact surface for material being transferred such that subsequent transfer operations may be conducted with a different liner where appropriate such that it is possible in such an instance to avoid the necessity for a complete clean down/sterilisation of all processing equipment; rather, the liner need simply be replaced with a different, sterilised liner. Upstream of the opening is a longitudinally extending sidewall 108 that has at one end, distal to the opening closable by door 104, a flange 110 which permits upstream processing equipment to be easily attached thereto. Upstream of the door 104 is an integrated valve closure member 111 that is moveable to selectively permit or prevent the flow of material. During material transfer, the valve will be closed until the active and passive members are secured together and their respective doors are moved out of the flow path and transfer is desired. The valve closure ember may then be moved to its open configuration to permit material transfer.

Figure 7A:
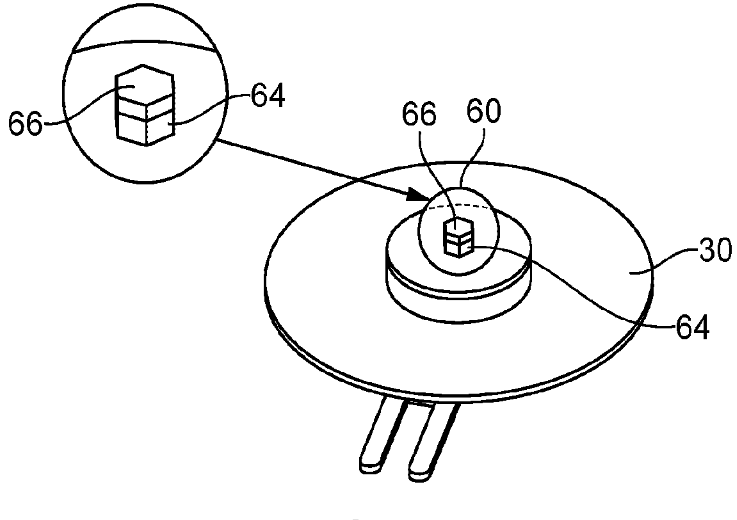
FIG. 7 *a* and *b* show an active door in accordance with the present invention.
Figure 7B:
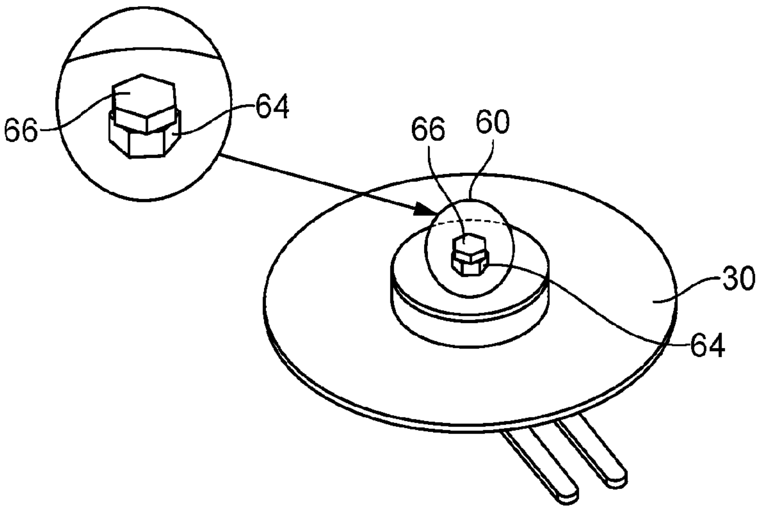

Selectively closing or opening the inlet 14 is door 30 having a centrally disposed locking key 60 which comprises a hexagonal drive having a lower portion 64 and an upper portion 66 being rotatable up to 30 degrees (FIGS. 7*a* and *b*). The door 104 of a passive member/element 100 has a complementarily shaped recess 112 to receive the hexagonal drive. Rotation of the upper portion 66 of the hexagonal drive (FIG. 7*b*) results in misalignment of the two portions and entraps the top half in an undercut 114 in the passive door 104. It is this entrapment that holds them together and the reverse locking action would also realign the hexagons and allow the doors to be separated. It will be appreciated that other polygonally shaped drives may be used successfully, such as for example, drives having cross sections selected from the group comprising: triangular, square, pentagonal, heptagonal, octagonal, nonagonal, decagonal etc.

The passive door 104 has an internal biasing mechanism a plurality of locking tabs 120 that are moveably mounted on a carrier 130. The locking tabs are moveable between an extended configuration where they co-operate with a circumferential channel 131 in inner sidewall face of the housing of the passive member and lock the door preventing it from being removed and a retracted configuration where the locking tabs are housed within the carrier 130 so that they do not extend beyond its circumference and the door is capable of being opened/removed.

Figure 8A:
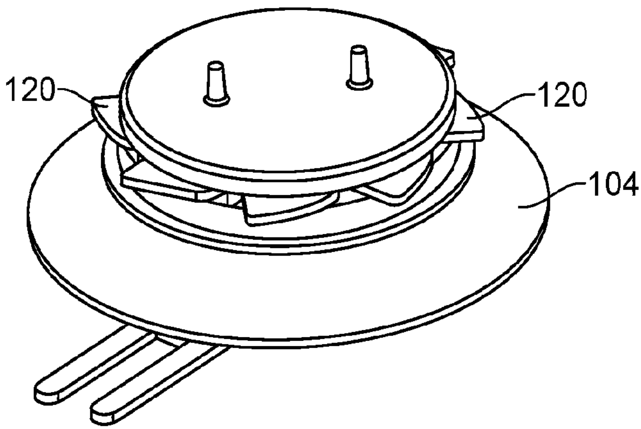
FIG. 8 *a* and *b* show a passive door in accordance with the present invention.
Figure 8B:
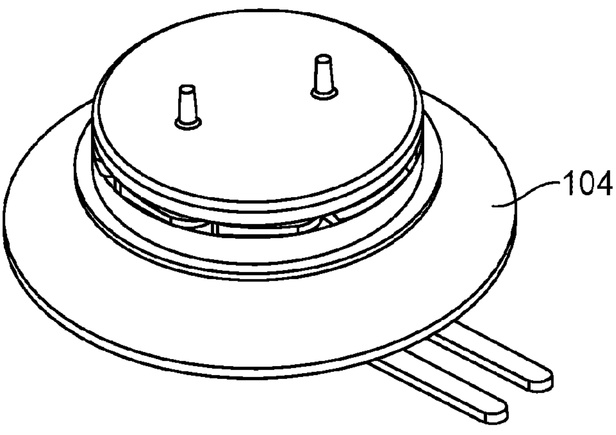

The biasing mechanism squeezes the passive door 104 onto the underside of the passive liner 106 to ensure a sterile seal. Only when the hexagonal drive on the active door 30 is pushed up inside the passive door 104 does it overcome the biasing force. Now that the biasing force is rendered ineffective, it is easy to rotate the drive and unlock the door by means of displacing the locking tabs 120 from their extended configuration (FIG. 8*a*) to their retracted configuration (FIG. 8*b*).

Figure 9A:
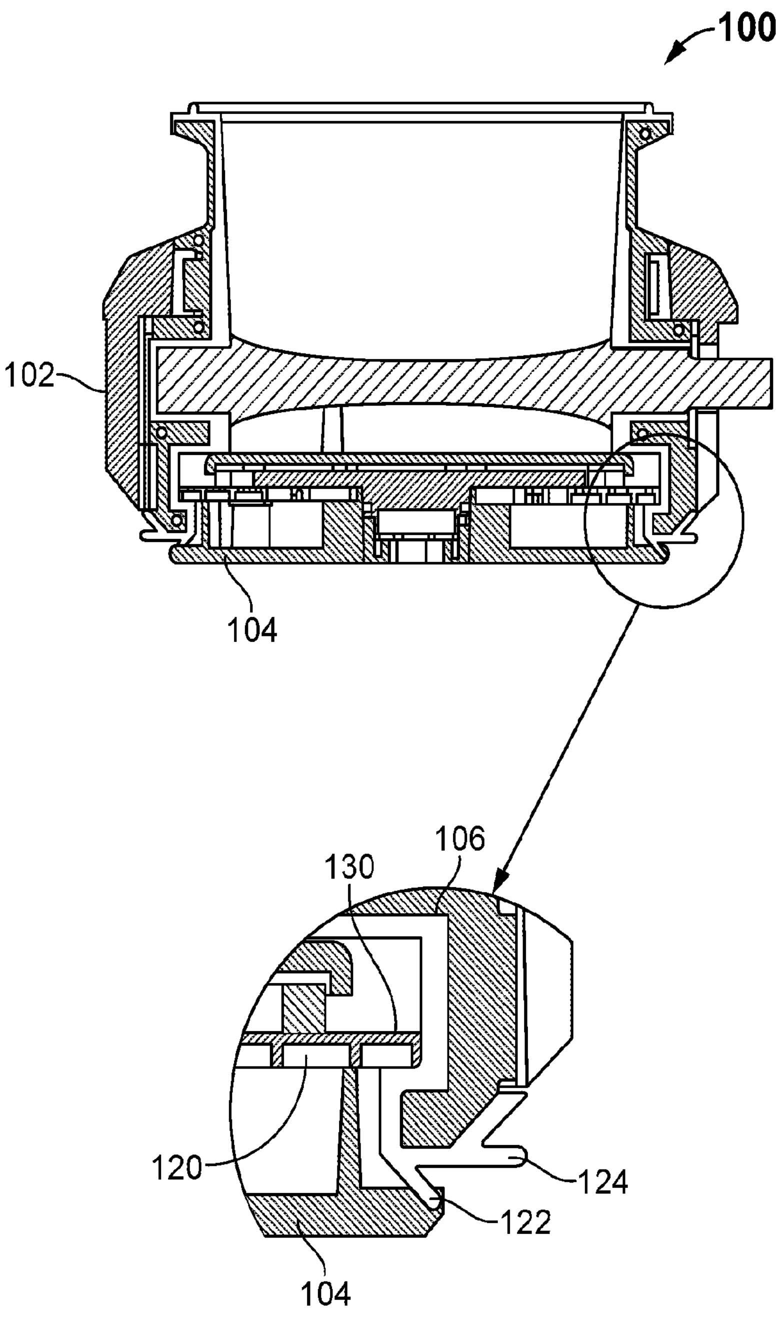
FIGS. 9*a* to *c* show a passive member and an enlarged partial sectional view of the door of a passive member, seal and housing.
Figure 9B:
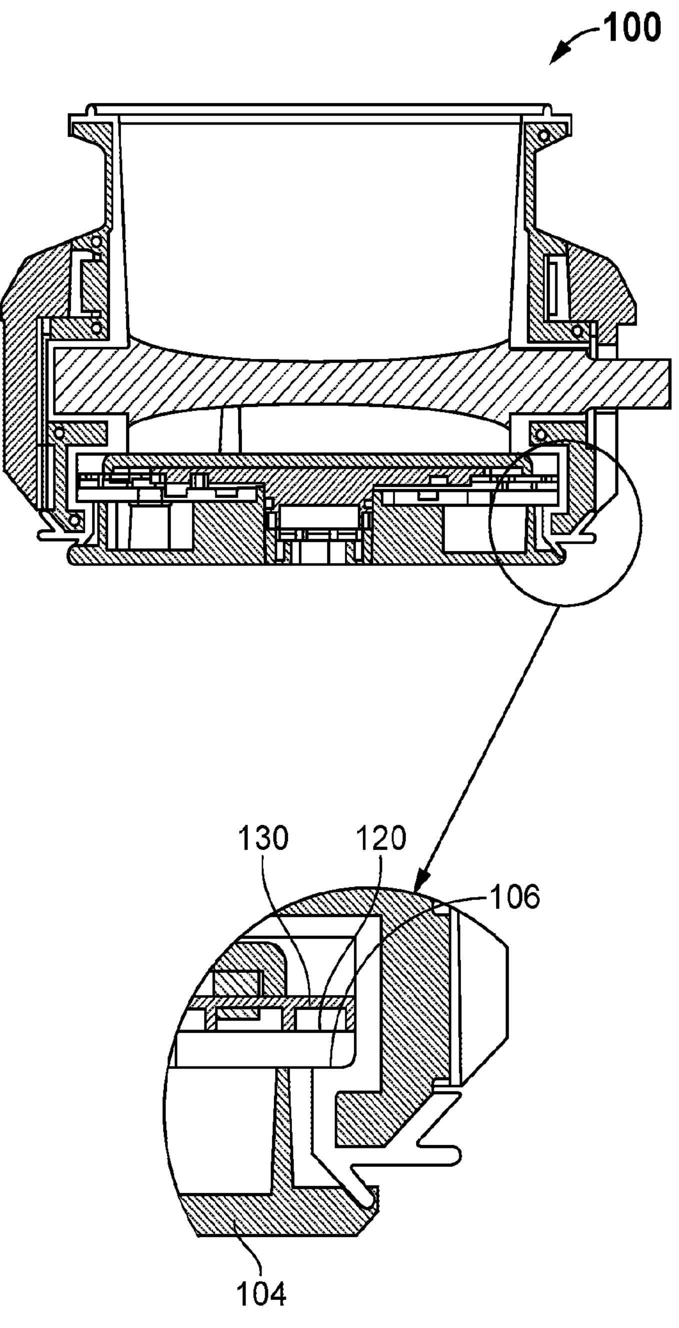
Figure 9C:
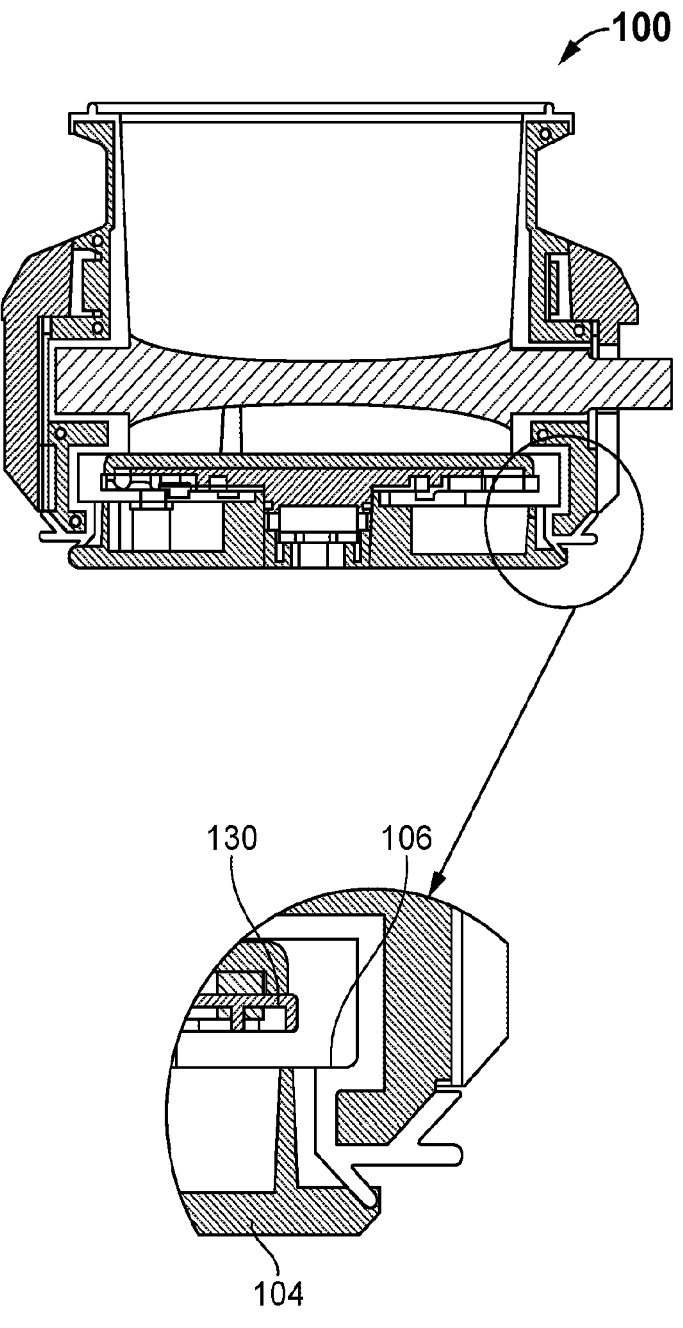
Figure 10A:
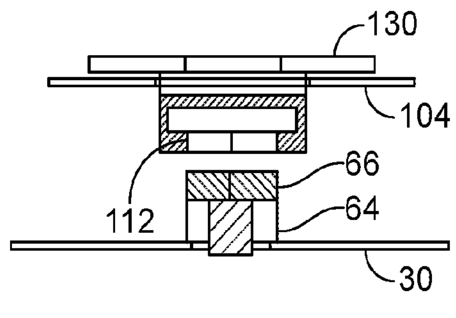
FIGS. 10*a* to *e* show a cross-sectional view of a centrally disposed locking key of the active door comprising a hexagonal drive and complementarily shaped recess within the passive door in accordance with the present invention.
Figure 10B:
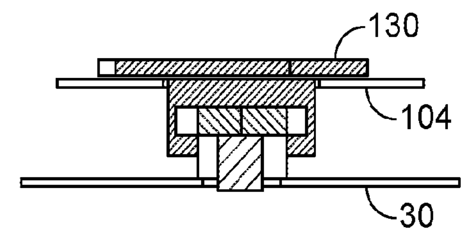
Figure 10C:
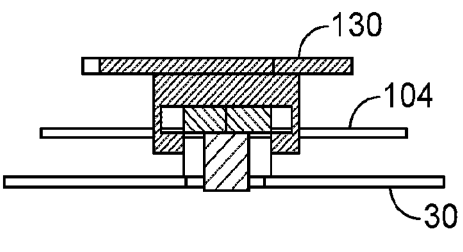
Figure 10D:
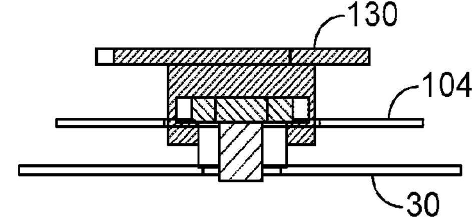
Figure 10E:
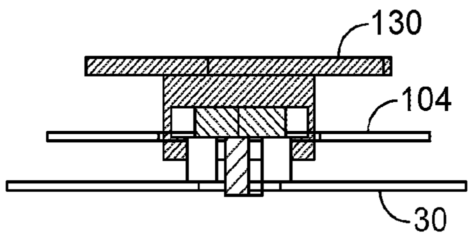

FIG. 9 a to c show a passive member 100 and the various stages associated with release of the seal to permit the door to be unlocked and moved to allow the port to communicate with the port of the active member to permit the passage of material therethrough.

FIG. 9 a shows the passive door 104 secured and sealed to the passive member housing 106. The passive member has a rubber lining 106 having two lips122, 124 that engage with the passive door 104 and the internal face of the inlet 14 of the housing of the active member 10, respectively. The two lips 122, 124 are designed in such a way to allow for tolerance variation while ensuring an adequate seal and minimise forces for docking or undocking.

The liner is a replaceable component and manufactured from a resiliently deformable material such as an elastomer, including silicone, for example. The liner has a shorter working lifespan compared with other components of the device and is intended to be replaced once a sufficiently pressurised seal is no longer possible. This ensures that a suitably flexible material may be used to manufacture the liner to form a seal between components.

FIG. 9 b shows the internal biasing mechanism in the passive door 100 overcome to displace the carrier 130 upon which are moveably mounted the locking tabs 120 away from the opening of the port and the passive door body and the underside of the passive liner 106.

FIG. 9 c shows the locking tabs 120 in their retracted configuration whereby the drive has been rotated to enable the removal of the passive door from the flow path to facilitate material transfer.

FIG. 10 a to e show the centrally disposed locking key 60 of the active member door which comprises a hexagonal drive having a lower portion 64 and an upper portion 66 being rotatable up to 30 degrees and the complementarily shaped recess 112 of the passive door 104 in its various configurations during the mating of the doors and unlocking of the passive door.

FIG. 10 a shows the hexagonal drive with the upper portion 66 and lower portion aligned and the passive door 104 having the complementarily shaped recess 112 being presented thereto.

FIG. 10 *b* shows the hexagonal drive inserted into and received by the recess.

FIG. 10 *c* shows the hexagonal drive having been displaced in a first direction, parallel with the longitudinal axis of the port of the passive member to release the seal between the underside of the liner 106 and the carrier 130 of the locking tabs 120 between the underside of the liner 106 and the carrier 130 withinthe passive door. Without this step, the torque required to release the seal to open the passive door would be too great.

FIG. 10 d shows the hexagonal drive displaced in a second direction, rotating a portion of the hexagonal drive whereby the hexagonal drive adopts a first configuration wherein the upper portion 66 is rotated 30 degrees to misalign with the upper portion of the hexagonal drive to secure the active and passive doors together.

FIG. 10 e shows the hexagonal drive displaced into a second configuration whereby the lower portion 64 and the upper portion 66 rotate and cooperate with the recess 112 of the passive door to displace the locking tabs from the extended to their retracted configuration to facilitate removal of the doors.

The invention claimed is:

1. A transfer device comprising an active and a passive member configured to mate and form a seal therebetween wherein the active member and passive member are releasably secured and sealed to one another, wherein each of the active member and passive member include a housing having a port and a door for selectively opening or closing the port to control the movement of material therethrough, wherein the door has a closed configuration in which the door is secured to the port and a seal is formed therebetween and the door is closed, and an open configuration wherein the seal is released and the door is open, wherein the housing of the active member further comprises an outlet configured to communicate with the port of the active member by means of a conduit with a flexible sidewall member moveable relative to the active member housing, said conduit secured at one end to the outlet and moveable within the housing between a stowed configuration in which the port and outlet are not in communication with one another and an extended configuration in which the port and outlet are in communication with one another via the conduit such that material may pass therethrough.

2. A transfer device as claimed in claim 1 wherein a portion of the conduit is fixedly mounted within the housing.

3. A transfer device as claimed in claim 2 wherein the conduit is fixedly mounted at a first end proximal to the outlet of the active housing.

4. A transfer device as claimed in claim 3 wherein a sterilising medium may be introduced under pressure.

5. A transfer device as claimed in claim 2 wherein the conduit is fixedly mounted at a second end proximal to the port of the active housing.

6. A transfer device as claimed in claim 5 wherein the conduit is fixedly mounted at a point along its length that is disposed between the port and the outlet of the active housing.

7. A transfer device as claimed in claim 1 wherein the conduit comprises a telescopically extending member.

8. A transfer device as claimed in claim 1 wherein the conduit facilitates communication between the port of the passive member and the outlet of the active member.

9. A transfer device as claimed in claim 1 wherein the active and passive member have a mated configuration in which a chamber comprising an inlet is formed between the outer surface of the doors of the active and passive members into which a sterilising medium may pass.

10. A transfer device as claimed in claim 1 wherein one of the doors comprises a male mating member comprising a protrusion and the other door comprises a complimentarily shaped female mating member, said male and female members configured to mate with one another to releasably secure and unlock at least one of the doors.

11. A transfer device as claimed in claim 10 wherein the passive member comprises means to selectively prevent the movement of material through the passive port when the passive door is in an open configuration.

12. A transfer device as claimed in claim 11 wherein the means to selectively prevent the movement of material through the passive port when the passive door is in an open configuration comprises a valve closure member.

13. A transfer device as claimed in claim 12 wherein the valve closure member has an open and a closed configuration to permit the passage of material therethrough or prevent the passage of material therethrough respectively.

14. A transfer device as claimed in claim 11 wherein the male member is associated with the active door and the female member associated with the passive door.

15. A transfer device as claimed in claim 11 wherein the female member is associated with the active door and the male member associated with the passive door.

16. A transfer device as claimed in claim 10 wherein the male member has a polygonal cross section.

17. A transfer device as claimed in 16 wherein the male member has a hexagonal cross section.

18. A transfer device as claimed in claim 16 wherein the male member comprises a main body one end of which is connected to a door and the free end having at least a portion thereof moveable relative to the main body.

19. A transfer device as claimed in claim 18 wherein the male member is moveable between a first configuration in which the main body and free end are aligned, a second configuration in which the main body and the free end are misaligned.

20. A transfer device as claimed in claim 19 wherein the male member is movable to a third configuration in which the main body and misaligned free end are both displaced from the first, aligned, configuration.

21. A transfer device as claimed in claim 10 wherein the male member is moveable to unlock the door comprising the female member.

22. A transfer device as claimed in claim 21 wherein the door comprising the female member comprises at least one locking member moveable between an extended configuration locking the door and a retracted configuration unlocking the door.

* * * * *